Patented Apr. 14, 1942

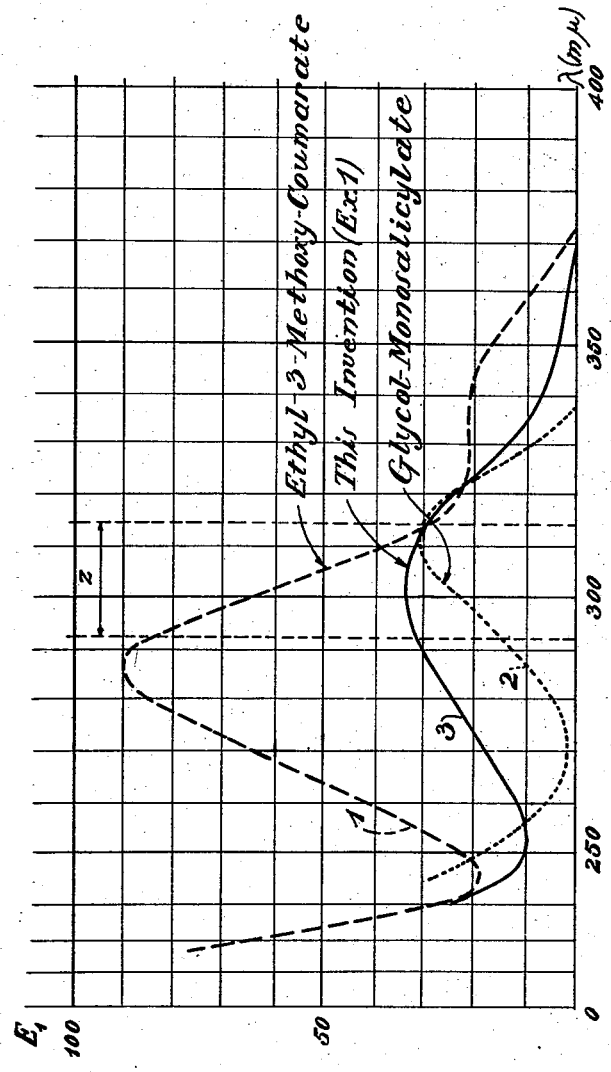

2,279,468

UNITED STATES PATENT OFFICE 2,279,468

PRODUCT OF ANTIERYTHEMIC ACTION

Joseph Edouard Gustave Lahousse and Anne Marguerite Lucienne Casati, Lyon, and Jean Louis Gonnard, Villeur-Banne, France, assignors to Societe des Usines Chimiques Rhone-Poulenc, Paris, France, a corporation of France Application February 15, 1940, Serial No. 319,052
In France May 20, 1939

7 Claims. (Cl. 167—90)

The present invention deals with improvements in products having antierythemic action, commonly called anti-sunburn products.

In copending U. S. application for patent Serial No. 232,527, filed September 30, 1938 (now Patent No. 2,213,717), Poizat and Lahousse have described esters of 3-methoxycoumaric acid and indicated that these novel bodies possess the interesting property of absorbing ultra-violet rays of short-wave length, known as erythemic rays, while nevertheless permitting the passage of ultra-violet rays of longer wave length, and visible light.

Although these bodies are soluble in the majority of excipients (notably vegetable oils) which are commonly utilized for the preparation of anti-sunburn compositions, their solubility is nevertheless very limited, which fact creates a certain difficulty in their utilization.

It is accordingly an object of this invention to provide a process for increasing the solubility of the said novel esters in the common excipients for anti-sunburn preparations. A further object is to produce novel compositions of matter having their maximum absorptive action in that zone of the spectrum where the erythemic action is most pronounced. Other and further important objects of this invention will appear as the description proceeds, reference being had to the accompanying drawing which constitutes part of this specification.

According to this invention, solutions of 3-methoxycoumaric esters in the common excipients of anti-sunburn compositions are prepared by operating in the presence of salicylates of mono or poly alcohols.

We have found that these salicylates, particularly butyl-salicylate and glycol-mono-salicylate,—products which are well soluble in the majority of oils and greases,—possess a good solvent power for the above mentioned 3-methoxycoumaric esters.

Thus, for instance, ethyl-3-methoxycoumarate is soluble to the extent of 37 grams in 100 grams of glycol-salicylate at 0°.

Moreover, we have found that the presence of these same salicylates increases the solubility of the said 3-methoxycoumaric esters in the usual excipients for anti-sunburn compositions.

Thus, the solubility at ordinary temperature of the same 3-methoxycoumaric ester is increased:

For arachidic oil,
to about 5%, by adding a weight of glycol-mono-salicylate equal to the weight of the methoxycoumarate;

For oil of sweet almonds,
to over 10%, by adding 3 times its weight of glycol-salicylate;

For refined cotton oil,
to over 40%, by the same addition.

These increases are calculated in per cent of the solution finally established.

It is known, furthermore, that salicylates themselves exhibit a desirable absorption band in the erythemic zone, and applicants have ascertained as part of this invention that one can combine the solutions described above in such a manner that the absorption curve shall be particularly favorable and produce results not obtainable by either ingredient alone. In the annexed drawing are reproduced, for example, the absorption curves of:

(1) Ethyl-3-methoxycoumarate
(2) Glycol-monosalicylate
(3) A mixture of these two bodies in the proportion of 25% of the former to 75% of the latter.

In this diagram the abscissas represent the wave length $\lambda$ in millimicrons, while the ordinates represent the coefficient of extinction $E_1$ according to the formula of Beer $$\log \frac{Io}{I} = E_1 CL$$

where $Io$ and $I$ are the intensities of the incident and transmitted light; $C$ is the concentration of the product in grams per liter; $L$ is the distance traversed in centimeters.

It will be clearly seen that the mixture indicated gives an absorption curve which presents its maximum exactly in the ultra violet region in the erythemic zone, that is the region of wavelengths between about 292 and about 315 millimicrons, and marked off on the drawing by the symbol Z.

For the preparation of the anti-sunburn compositions themselves, one may proceed as indicated in the following examples, which are given of course solely for the purpose of illustration, without intent to limit the invention thereby.

Example 1

25 grams of ethyl-3-methoxycoumarate are dissolved by slight heating in 75 grams of glycol-mono-salicylate, and the liquid mixture obtained is run into two liters of ordinary arachidic oil. The mixture is allowed to cool.

Example 2

2 grams of butyl-salicylate are dissolved in 96 grams of refined cotton oil, and 2 grams of butyl-3-methoxycoumarate are added into the preceding tepid solution. The mixture is agitated and allowed to cool.

We are aware that esters of salicylic acid have been suggested by themselves as anti-sunburn compounds. In this invention, however, we are concerned primarily with a different property of these salicylic esters, namely their solvent action upon esters of 3-methoxy-coumaric acid. This action involves questions of compatibility and relates to a field of physical behavior of compounds which is not fully understood and where little prediction can be made on the basis of theory.

Furthermore, as shown by the annexed drawing, the combination of glycol monosalicylate with an alkyl-ester of 3-methoxy-coumaric acid according to this invention results in a composition of matter which has its maximum anti-erythemic action at just the zone where its action is most desirable, an effect which is not obtainable by the use of either of the two components by itself.

This invention is applicable to any of the lower-alkyl esters of 3-methoxy-coumaric acid mentioned in copending application Serial No. 232,527; in other words, the alkyl portion of the ester may be anything from methyl to amyl or isoamyl. Likewise, as salicyclic ester may be employed any of the common esters of this acid which are liquid at ordinary temperature and have good solubility in oils and greases; for instance, the butyl, amyl, benzyl or menthyl esters, or the mono-esters of this acid with glycol or with 1,3-butane-diol.

In the claims below, the expression "oily excipient" shall be understood as a generic expression for oils and greases which are adopted for use as excipients for anti-sunburn preparations of the type above discussed, as distinguished from powders or other solid excipients.

We claim:

1. An anti-sunburn preparation comprising a mixture of an alkyl ester of 3-methoxy-coumaric acid and an oil-soluble, liquid ester of salicyclic acid in a common oily excipient, the concentration of the coumaric acid ester in said preparation being greater than would be obtainable by dissolving the same ester in the same excipient in the absence of said liquid ester of salicyclic acid.

2. An anti-sunburn preparation comprising an alkyl ester of 3-methoxy-coumaric acid and a monosalicyclic ester of a polyhydric alcohol dissolved jointly in a common oily excipient, the concentration of the coumaric acid ester in said preparation being greater than would be obtainable by dissolving the same ester in the same excipient in the absence of said monosalicylic ester, and the preparation having its maximum absorptive power at a wave length in the region where erythemic action is most pronounced.

3. An anti-sunburn preparation comprising a mixture of ethyl-3-methoxy-coumarate and glycol-monosalicylate dissolved jointly in a common oily excipient, the concentration of said coumarate in said preparation being greater than would be obtainable by dissolving the same ester in the same excipient in the absence of said monosalicylate, and the preparation having its maximum absorptive power at a wave length between about 292 and about 315 millimicrons.

4. A preparation as defined in claim 2, the proportion of 3-methoxy-coumaric ester to the monosalicylic ester being not greater than 1:1 by weight.

5. A preparation as defined in claim 3, the proportion of ethyl-3-methoxy-coumarate to glycol mono-salicylate being substantially 25:75 by weight.

6. An anti-sunburn preparation comprising a lower alkyl ester of 3-methoxycoumaric acid and a lower alkyl ester of salicyclic acid dissolved jointly in a common oily excipient, the concentration of the coumaric acid ester in said preparation being greater than would be obtainable by dissolving the same ester in the same excipient in the absence of said salicylic acid ester, and the preparation having its maximum absorptive power at a wave length in the region where erythemic action is most pronounced.

7. An anti-sunburn preparation comprising a mixture of ethyl-3-methoxy-coumarate and butyl-salicylate dissolved jointly in a common oily excipient, the concentration of said coumarate in said preparation being greater than would be obtainable by dissolving the same ester in the same excipient in the absence of said salicylate, and the preparation having its maximum absorptive power at a wave length in the region where erythemic action is most pronounced.

JOSEPH EDOUARD GUSTAVE LAHOUSSE.
ANNE MARGUERITE LUCIENNE CASATI.
JEAN LOUIS GONNARD.